United States Patent
Golshan et al.

(10) Patent No.: US 9,806,943 B2
(45) Date of Patent: Oct. 31, 2017

(54) ENABLING PLANNED UPGRADE/DOWNGRADE OF NETWORK DEVICES WITHOUT IMPACTING NETWORK SESSIONS

(71) Applicant: A10 NETWORKS, INC., San Jose, CA (US)

(72) Inventors: Ali Golshan, Palo Alto, CA (US); Swaminathan Sankar, San Jose, CA (US); Venky Natham, Fremont, CA (US)

(73) Assignee: A10 NETWORKS, INC., San Jose, CA (US)

( * ) Notice: Subject to any disclaimer, the term of this patent is extended or adjusted under 35 U.S.C. 154(b) by 671 days.

(21) Appl. No.: 14/261,310

(22) Filed: Apr. 24, 2014

(65) Prior Publication Data

US 2015/0312092 A1    Oct. 29, 2015

(51) Int. Cl.
*H04L 12/24* (2006.01)
*H04L 29/08* (2006.01)

(52) U.S. Cl.
CPC ...... *H04L 41/0803* (2013.01); *H04L 67/1023* (2013.01); *H04L 67/148* (2013.01); *H04L 67/34* (2013.01); *H04L 67/1027* (2013.01); *H04L 67/145* (2013.01)

(58) Field of Classification Search
CPC ............. H04L 41/0803; H04L 67/1023; H04L 67/148; H04L 67/34
See application file for complete search history.

(56) References Cited

U.S. PATENT DOCUMENTS

| | | |
|---|---|---|
| 4,720,850 A | 1/1988 | Oberlander et al. |
| 4,864,492 A | 9/1989 | Blakely-Fogel et al. |
| 4,882,699 A | 11/1989 | Evensen |
| 5,218,676 A | 6/1993 | Ben-Ayed et al. |

(Continued)

FOREIGN PATENT DOCUMENTS

| | | |
|---|---|---|
| CN | 1372662 A | 10/2002 |
| CN | 1473300 A | 2/2004 |

(Continued)

OTHER PUBLICATIONS

Goldszmidt et al., "NetDispatcher: A TCP Connection Router," IBM Research Report RC 20853, May 19, 1997, pp. 1-31.

(Continued)

*Primary Examiner* — Nicholas Taylor
*Assistant Examiner* — Afroza Sultana
(74) *Attorney, Agent, or Firm* — AMPACC Law Group, LLP

(57) ABSTRACT

Exemplary embodiments for enabling planned network changes such as an upgrade or downgrade of a network device are disclosed. The systems and methods provide for planned upgrades and downgrades for network devices without impacting existing network sessions, by utilizing two network devices simultaneously, and creating a redirect network session for a predetermined period of time. In so doing, all network traffic may be gradually transferred to the second network device, until the sessions processed by the first network device time out. The first network device can then be taken offline for upgrade or downgrade, without any disruption to the network service or loss of network traffic.

20 Claims, 4 Drawing Sheets

(56) References Cited

U.S. PATENT DOCUMENTS

| | | |
|---|---|---|
| 5,293,488 A | 3/1994 | Riley et al. |
| 5,432,908 A | 7/1995 | Heddes et al. |
| 5,774,660 A | 6/1998 | Brendel et al. |
| 5,781,550 A | 7/1998 | Templin et al. |
| 5,862,339 A | 1/1999 | Bonnaure et al. |
| 5,875,185 A | 2/1999 | Wang et al. |
| 5,931,914 A | 8/1999 | Chiu |
| 5,958,053 A | 9/1999 | Denker |
| 6,003,069 A | 12/1999 | Cavill |
| 6,047,268 A | 4/2000 | Bartoli et al. |
| 6,075,783 A | 6/2000 | Voit |
| 6,131,163 A | 10/2000 | Wiegel |
| 6,141,749 A | 10/2000 | Coss et al. |
| 6,167,428 A | 12/2000 | Ellis |
| 6,321,338 B1 | 11/2001 | Porras et al. |
| 6,324,286 B1 | 11/2001 | Lai et al. |
| 6,360,265 B1 | 3/2002 | Falck et al. |
| 6,363,075 B1 | 3/2002 | Huang et al. |
| 6,374,300 B2 | 4/2002 | Masters |
| 6,389,462 B1 | 5/2002 | Cohen et al. |
| 6,415,329 B1 | 7/2002 | Gelman et al. |
| 6,456,617 B1 | 9/2002 | Oda et al. |
| 6,483,600 B1 | 11/2002 | Schuster et al. |
| 6,519,243 B1 | 2/2003 | Nonaka et al. |
| 6,535,516 B1 | 3/2003 | Leu et al. |
| 6,578,066 B1 | 6/2003 | Logan et al. |
| 6,587,866 B1 | 7/2003 | Modi et al. |
| 6,600,738 B1 | 7/2003 | Alperovich et al. |
| 6,658,114 B1 | 12/2003 | Farn et al. |
| 6,772,205 B1 | 8/2004 | Lavian et al. |
| 6,772,334 B1 | 8/2004 | Glawitsch |
| 6,779,033 B1 | 8/2004 | Watson et al. |
| 6,804,224 B1 | 10/2004 | Schuster et al. |
| 6,832,322 B1 | 12/2004 | Boden et al. |
| 7,010,605 B1 | 3/2006 | Dharmarajan |
| 7,013,338 B1 | 3/2006 | Nag et al. |
| 7,058,718 B2 | 6/2006 | Fontes et al. |
| 7,058,789 B2 | 6/2006 | Henderson et al. |
| 7,058,973 B1 | 6/2006 | Sultan |
| 7,069,438 B2 | 6/2006 | Balabine et al. |
| 7,086,086 B2 | 8/2006 | Ellis |
| 7,111,162 B1 | 9/2006 | Bagepalli et al. |
| 7,143,087 B2 | 11/2006 | Fairweather |
| 7,167,927 B2 | 1/2007 | Philbrick et al. |
| 7,181,524 B1 | 2/2007 | Lele |
| 7,228,359 B1 | 6/2007 | Monteiro |
| 7,254,133 B2 | 8/2007 | Govindarajan et al. |
| 7,266,604 B1 | 9/2007 | Nathan et al. |
| 7,269,850 B2 | 9/2007 | Govindarajan et al. |
| 7,284,272 B2 | 10/2007 | Howard et al. |
| 7,290,050 B1 | 10/2007 | Smith et al. |
| 7,301,899 B2 | 11/2007 | Goldstone |
| 7,308,710 B2 | 12/2007 | Yarborough |
| 7,310,686 B2 | 12/2007 | Uysal |
| 7,328,267 B1 | 2/2008 | Bashyam et al. |
| 7,337,241 B2 | 2/2008 | Boucher et al. |
| 7,343,399 B2 | 3/2008 | Hayball et al. |
| 7,370,100 B1 | 5/2008 | Gunturu |
| 7,370,353 B2 | 5/2008 | Yang |
| 7,373,500 B2 | 5/2008 | Ramelson et al. |
| 7,391,725 B2 | 6/2008 | Huitema et al. |
| 7,398,317 B2 | 7/2008 | Chen et al. |
| 7,406,709 B2 | 7/2008 | Maher, III et al. |
| 7,423,977 B1 | 9/2008 | Joshi |
| 7,430,755 B1 | 9/2008 | Hughes et al. |
| 7,441,270 B1 | 10/2008 | Edwards et al. |
| 7,451,312 B2 | 11/2008 | Medvinsky et al. |
| 7,467,202 B2 | 12/2008 | Savchuk |
| 7,506,360 B1 | 3/2009 | Wilkinson et al. |
| 7,512,980 B2 | 3/2009 | Copeland et al. |
| 7,516,485 B1 | 4/2009 | Lee et al. |
| 7,529,242 B1 | 5/2009 | Lyle |
| 7,552,323 B2 | 6/2009 | Shay |
| 7,568,041 B1 | 7/2009 | Turner et al. |
| 7,583,668 B1 | 9/2009 | Mayes et al. |
| 7,584,262 B1 | 9/2009 | Wang et al. |
| 7,590,736 B2 | 9/2009 | Hydrie et al. |
| 7,591,001 B2 | 9/2009 | Shay |
| 7,603,454 B2 | 10/2009 | Piper |
| 7,610,622 B2 | 10/2009 | Touitou et al. |
| 7,613,193 B2 | 11/2009 | Swami et al. |
| 7,613,822 B2 | 11/2009 | Joy et al. |
| 7,673,072 B2 | 3/2010 | Boucher et al. |
| 7,675,854 B2 | 3/2010 | Chen et al. |
| 7,711,790 B1 | 5/2010 | Barrett et al. |
| 7,716,369 B2 | 5/2010 | Le Pennec et al. |
| 7,733,866 B2 | 6/2010 | Mishra et al. |
| 7,747,748 B2 | 6/2010 | Allen |
| 7,779,130 B1 | 8/2010 | Toutonghi |
| 7,826,487 B1 | 11/2010 | Mukerji et al. |
| 7,908,651 B2 | 3/2011 | Maher |
| 7,948,952 B2 | 5/2011 | Hurtta et al. |
| 7,965,727 B2 | 6/2011 | Sakata et al. |
| 7,979,694 B2 | 7/2011 | Touitou et al. |
| 7,990,847 B1 | 8/2011 | Leroy et al. |
| 7,992,201 B2 | 8/2011 | Aldridge et al. |
| 8,079,077 B2 | 12/2011 | Chen et al. |
| 8,081,640 B2 | 12/2011 | Ozawa et al. |
| 8,090,866 B1 | 1/2012 | Bashyam et al. |
| 8,099,492 B2 | 1/2012 | Dahlin et al. |
| 8,116,312 B2 | 2/2012 | Riddoch et al. |
| 8,122,116 B2 | 2/2012 | Matsunaga et al. |
| 8,151,019 B1 | 4/2012 | Le et al. |
| 8,185,651 B2 | 5/2012 | Moran et al. |
| 8,244,876 B2 | 8/2012 | Sollee |
| 8,255,644 B2 | 8/2012 | Sonnier et al. |
| 8,261,339 B2 | 9/2012 | Aldridge et al. |
| 8,291,487 B1 | 10/2012 | Chen et al. |
| 8,327,128 B1 | 12/2012 | Prince et al. |
| 8,332,925 B2 | 12/2012 | Chen et al. |
| 8,347,392 B2 | 1/2013 | Chess et al. |
| 8,379,515 B1 | 2/2013 | Mukerji |
| 8,387,128 B1 | 2/2013 | Chen et al. |
| 8,464,333 B1 | 6/2013 | Chen et al. |
| 8,520,615 B2 | 8/2013 | Mehta et al. |
| 8,559,437 B2 | 10/2013 | Mishra et al. |
| 8,560,693 B1 | 10/2013 | Wang et al. |
| 8,595,383 B2 | 11/2013 | Chen et al. |
| 8,595,819 B1 | 11/2013 | Chen et al. |
| RE44,701 E | 1/2014 | Chen et al. |
| 8,675,488 B1 | 3/2014 | Sidebottom et al. |
| 8,681,610 B1 | 3/2014 | Mukerji |
| 8,782,221 B2 | 7/2014 | Han |
| 8,904,512 B1 | 12/2014 | Chen et al. |
| 8,914,871 B1 | 12/2014 | Chen et al. |
| 8,918,857 B1 | 12/2014 | Chen et al. |
| RE45,347 E | 1/2015 | Chun et al. |
| 8,943,577 B1 | 1/2015 | Chen et al. |
| 8,977,749 B1 | 3/2015 | Han |
| 8,996,670 B2 | 3/2015 | Kupinsky et al. |
| 9,032,502 B1 | 5/2015 | Chen et al. |
| 9,094,364 B2 | 7/2015 | Jalan et al. |
| 9,106,561 B2 | 8/2015 | Jalan et al. |
| 9,118,618 B2 | 8/2015 | Davis |
| 9,118,620 B1 | 8/2015 | Davis |
| 9,124,550 B1 | 9/2015 | Chen et al. |
| 9,137,301 B1 | 9/2015 | Dunlap et al. |
| 9,154,584 B1 | 10/2015 | Han |
| 9,258,332 B2 | 2/2016 | Chen et al. |
| 9,386,088 B2 | 7/2016 | Zheng et al. |
| 9,531,846 B2 | 12/2016 | Han et al. |
| 9,602,442 B2 | 3/2017 | Han |
| 2001/0015812 A1 | 8/2001 | Sugaya |
| 2001/0023442 A1 | 9/2001 | Masters |
| 2001/0042200 A1 | 11/2001 | Lamberton et al. |
| 2002/0026515 A1 | 2/2002 | Michielsens et al. |
| 2002/0026531 A1 | 2/2002 | Keane et al. |
| 2002/0032799 A1 | 3/2002 | Wiedeman et al. |
| 2002/0046348 A1 | 4/2002 | Brustoloni |
| 2002/0053031 A1 | 5/2002 | Bendinelli et al. |
| 2002/0078164 A1 | 6/2002 | Reinschmidt |
| 2002/0091844 A1 | 7/2002 | Craft et al. |
| 2002/0103916 A1 | 8/2002 | Chen et al. |
| 2002/0138618 A1 | 9/2002 | Szabo |

(56) References Cited

U.S. PATENT DOCUMENTS

| | | |
|---|---|---|
| 2002/0141386 A1 | 10/2002 | Minert et al. |
| 2002/0141448 A1 | 10/2002 | Matsunaga |
| 2002/0143955 A1 | 10/2002 | Shimada et al. |
| 2002/0143991 A1 | 10/2002 | Chow et al. |
| 2002/0188678 A1 | 12/2002 | Edecker et al. |
| 2003/0009591 A1 | 1/2003 | Hayball et al. |
| 2003/0035409 A1 | 2/2003 | Wang et al. |
| 2003/0061506 A1 | 3/2003 | Cooper et al. |
| 2003/0065950 A1 | 4/2003 | Yarborough |
| 2003/0081624 A1 | 5/2003 | Aggarwal et al. |
| 2003/0088788 A1 | 5/2003 | Yang |
| 2003/0135625 A1 | 7/2003 | Fontes et al. |
| 2003/0135653 A1 | 7/2003 | Marovich |
| 2003/0152078 A1 | 8/2003 | Henderson et al. |
| 2003/0167340 A1 | 9/2003 | Jonsson |
| 2003/0229809 A1 | 12/2003 | Wexler et al. |
| 2004/0010545 A1 | 1/2004 | Pandya |
| 2004/0054920 A1 | 3/2004 | Wilson et al. |
| 2004/0062246 A1 | 4/2004 | Boucher et al. |
| 2004/0073703 A1 | 4/2004 | Boucher et al. |
| 2004/0078419 A1 | 4/2004 | Ferrari et al. |
| 2004/0078480 A1 | 4/2004 | Boucher et al. |
| 2004/0103315 A1 | 5/2004 | Cooper et al. |
| 2004/0107360 A1 | 6/2004 | Herrmann et al. |
| 2004/0184442 A1 | 9/2004 | Jones et al. |
| 2004/0243718 A1 | 12/2004 | Fujiyoshi |
| 2004/0250059 A1* | 12/2004 | Ramelson ........... H04L 63/0428 713/150 |
| 2005/0005207 A1 | 1/2005 | Herneque |
| 2005/0027947 A1 | 2/2005 | Landin |
| 2005/0033985 A1 | 2/2005 | Xu et al. |
| 2005/0036511 A1 | 2/2005 | Baratakke et al. |
| 2005/0038898 A1 | 2/2005 | Mittig et al. |
| 2005/0039033 A1 | 2/2005 | Meyers et al. |
| 2005/0050364 A1 | 3/2005 | Feng |
| 2005/0074001 A1 | 4/2005 | Mattes et al. |
| 2005/0080890 A1 | 4/2005 | Yang et al. |
| 2005/0114492 A1 | 5/2005 | Arberg et al. |
| 2005/0135422 A1 | 6/2005 | Yeh |
| 2005/0144468 A1 | 6/2005 | Northcutt et al. |
| 2005/0163073 A1 | 7/2005 | Heller et al. |
| 2005/0169285 A1 | 8/2005 | Wills et al. |
| 2005/0198335 A1 | 9/2005 | Brown et al. |
| 2005/0213586 A1 | 9/2005 | Cyganski et al. |
| 2005/0240989 A1 | 10/2005 | Kim et al. |
| 2005/0251856 A1 | 11/2005 | Araujo et al. |
| 2005/0281190 A1* | 12/2005 | McGee ............... H04L 41/0659 370/216 |
| 2006/0023721 A1 | 2/2006 | Miyake et al. |
| 2006/0031506 A1 | 2/2006 | Redgate |
| 2006/0036610 A1 | 2/2006 | Wang |
| 2006/0041745 A1 | 2/2006 | Parnes |
| 2006/0062142 A1 | 3/2006 | Appanna et al. |
| 2006/0063517 A1 | 3/2006 | Oh et al. |
| 2006/0064440 A1 | 3/2006 | Perry |
| 2006/0069804 A1 | 3/2006 | Miyake et al. |
| 2006/0080446 A1 | 4/2006 | Bahl |
| 2006/0126625 A1 | 6/2006 | Schollmeier et al. |
| 2006/0164978 A1 | 7/2006 | Werner et al. |
| 2006/0168319 A1 | 7/2006 | Trossen |
| 2006/0195698 A1 | 8/2006 | Pinkerton et al. |
| 2006/0227771 A1 | 10/2006 | Raghunath et al. |
| 2006/0230129 A1 | 10/2006 | Swami et al. |
| 2006/0233100 A1 | 10/2006 | Luft et al. |
| 2006/0280121 A1 | 12/2006 | Matoba |
| 2007/0002857 A1 | 1/2007 | Maher |
| 2007/0011419 A1 | 1/2007 | Conti |
| 2007/0019543 A1 | 1/2007 | Wei et al. |
| 2007/0022479 A1 | 1/2007 | Sikdar et al. |
| 2007/0076653 A1 | 4/2007 | Park et al. |
| 2007/0124487 A1 | 5/2007 | Yoshimoto et al. |
| 2007/0124502 A1 | 5/2007 | Li |
| 2007/0165622 A1 | 7/2007 | O'Rourke et al. |
| 2007/0177506 A1 | 8/2007 | Singer et al. |
| 2007/0180119 A1 | 8/2007 | Khivesara et al. |
| 2007/0180226 A1 | 8/2007 | Schory et al. |
| 2007/0180513 A1 | 8/2007 | Raz et al. |
| 2007/0185998 A1 | 8/2007 | Touitou et al. |
| 2007/0195792 A1 | 8/2007 | Chen et al. |
| 2007/0230337 A1 | 10/2007 | Igarashi et al. |
| 2007/0242738 A1 | 10/2007 | Park et al. |
| 2007/0243879 A1 | 10/2007 | Park et al. |
| 2007/0245090 A1 | 10/2007 | King et al. |
| 2007/0248009 A1 | 10/2007 | Petersen |
| 2007/0294694 A1 | 12/2007 | Jeter et al. |
| 2008/0016161 A1 | 1/2008 | Tsirtsis et al. |
| 2008/0031263 A1 | 2/2008 | Ervin et al. |
| 2008/0034111 A1 | 2/2008 | Kamath et al. |
| 2008/0034419 A1 | 2/2008 | Mullick et al. |
| 2008/0040789 A1 | 2/2008 | Chen et al. |
| 2008/0076432 A1 | 3/2008 | Senarath et al. |
| 2008/0120129 A1 | 5/2008 | Seubert et al. |
| 2008/0216177 A1 | 9/2008 | Yokosato et al. |
| 2008/0225722 A1 | 9/2008 | Khemani et al. |
| 2008/0253390 A1 | 10/2008 | Das et al. |
| 2008/0289044 A1 | 11/2008 | Choi |
| 2008/0291911 A1 | 11/2008 | Lee et al. |
| 2008/0298303 A1 | 12/2008 | Tsirtsis |
| 2009/0024722 A1* | 1/2009 | Sethuraman ........ H04L 12/2602 709/220 |
| 2009/0031415 A1 | 1/2009 | Aldridge et al. |
| 2009/0049537 A1 | 2/2009 | Chen et al. |
| 2009/0077651 A1 | 3/2009 | Poeluev |
| 2009/0092124 A1 | 4/2009 | Singhal et al. |
| 2009/0113536 A1 | 4/2009 | Zhang et al. |
| 2009/0138606 A1 | 5/2009 | Moran et al. |
| 2009/0138945 A1 | 5/2009 | Savchuk |
| 2009/0164614 A1 | 6/2009 | Christian et al. |
| 2009/0210698 A1 | 8/2009 | Candelore |
| 2009/0285196 A1 | 11/2009 | Lee et al. |
| 2009/0288134 A1 | 11/2009 | Foottit et al. |
| 2010/0042869 A1* | 2/2010 | Szabo ..................... G06F 8/67 714/4.1 |
| 2010/0054139 A1 | 3/2010 | Chun et al. |
| 2010/0061319 A1 | 3/2010 | Aso et al. |
| 2010/0064008 A1 | 3/2010 | Yan et al. |
| 2010/0095018 A1 | 4/2010 | Khemani et al. |
| 2010/0106854 A1 | 4/2010 | Kim et al. |
| 2010/0205310 A1 | 8/2010 | Altshuler et al. |
| 2010/0228819 A1 | 9/2010 | Wei |
| 2010/0235522 A1 | 9/2010 | Chen et al. |
| 2010/0238828 A1 | 9/2010 | Russell |
| 2010/0257278 A1 | 10/2010 | Gunturu |
| 2010/0262819 A1 | 10/2010 | Yang et al. |
| 2010/0265824 A1 | 10/2010 | Chao et al. |
| 2010/0268814 A1 | 10/2010 | Cross et al. |
| 2010/0318631 A1 | 12/2010 | Shukla |
| 2010/0322252 A1 | 12/2010 | Suganthi et al. |
| 2010/0333101 A1 | 12/2010 | Pope et al. |
| 2010/0333209 A1 | 12/2010 | Alve |
| 2011/0007652 A1 | 1/2011 | Bai |
| 2011/0032941 A1 | 2/2011 | Quach et al. |
| 2011/0060831 A1 | 3/2011 | Ishii et al. |
| 2011/0083174 A1 | 4/2011 | Aldridge et al. |
| 2011/0093522 A1 | 4/2011 | Chen et al. |
| 2011/0099623 A1 | 4/2011 | Garrard et al. |
| 2011/0149879 A1 | 6/2011 | Noriega et al. |
| 2011/0209157 A1 | 8/2011 | Sumida et al. |
| 2011/0276982 A1 | 11/2011 | Nakayama et al. |
| 2011/0302256 A1 | 12/2011 | Sureshehandra et al. |
| 2011/0307606 A1 | 12/2011 | Cobb |
| 2012/0008495 A1 | 1/2012 | Shen et al. |
| 2012/0026897 A1 | 2/2012 | Guichard et al. |
| 2012/0039175 A1 | 2/2012 | Sridhar et al. |
| 2012/0117382 A1 | 5/2012 | Larson et al. |
| 2012/0155495 A1 | 6/2012 | Clee et al. |
| 2012/0173759 A1 | 7/2012 | Agarwal et al. |
| 2012/0215910 A1 | 8/2012 | Wada |
| 2012/0290727 A1 | 11/2012 | Tivig |
| 2013/0089099 A1 | 4/2013 | Pollock et al. |
| 2013/0135996 A1 | 5/2013 | Torres et al. |
| 2013/0136139 A1 | 5/2013 | Zheng et al. |
| 2013/0166762 A1 | 6/2013 | Jalan et al. |
| 2013/0176854 A1 | 7/2013 | Chisu et al. |

(56) References Cited

U.S. PATENT DOCUMENTS

| | | |
|---|---|---|
| 2013/0176908 A1 | 7/2013 | Baniel et al. |
| 2013/0191486 A1 | 7/2013 | Someya et al. |
| 2013/0191548 A1 | 7/2013 | Boddukuri et al. |
| 2013/0212242 A1 | 8/2013 | Mendiratta et al. |
| 2013/0227165 A1 | 8/2013 | Liu |
| 2013/0250765 A1 | 9/2013 | Ehsan et al. |
| 2013/0258846 A1 | 10/2013 | Damola |
| 2013/0262702 A1 | 10/2013 | Davis |
| 2013/0311686 A1 | 11/2013 | Fetterman et al. |
| 2013/0315241 A1 | 11/2013 | Kamat et al. |
| 2014/0012972 A1 | 1/2014 | Han |
| 2014/0086052 A1 | 3/2014 | Cai et al. |
| 2014/0169168 A1 | 6/2014 | Jalan et al. |
| 2014/0207845 A1 | 7/2014 | Han et al. |
| 2014/0254367 A1 | 9/2014 | Jeong et al. |
| 2014/0258536 A1 | 9/2014 | Chiong |
| 2014/0286313 A1 | 9/2014 | Fu et al. |
| 2014/0359052 A1 | 12/2014 | Joachimpillai et al. |
| 2015/0026794 A1 | 1/2015 | Zuk et al. |
| 2015/0047012 A1 | 2/2015 | Chen et al. |
| 2015/0156223 A1 | 6/2015 | Xu et al. |
| 2015/0237173 A1 | 8/2015 | Virkki et al. |
| 2015/0244566 A1* | 8/2015 | Puimedon ............ H04L 41/0816 709/220 |
| 2015/0296058 A1 | 10/2015 | Jalan et al. |
| 2015/0350048 A1 | 12/2015 | Sampat et al. |
| 2015/0350379 A1 | 12/2015 | Jalan et al. |
| 2015/0350383 A1 | 12/2015 | Davis |
| 2016/0014052 A1 | 1/2016 | Han |
| 2016/0014126 A1 | 1/2016 | Jalan et al. |
| 2016/0065619 A1 | 3/2016 | Chen et al. |
| 2017/0048107 A1 | 2/2017 | Dosovitsky et al. |
| 2017/0048356 A1 | 2/2017 | Thompson et al. |

FOREIGN PATENT DOCUMENTS

| | | |
|---|---|---|
| CN | 1529460 A | 9/2004 |
| CN | 1575582 A | 2/2005 |
| CN | 1910869 A | 2/2007 |
| CN | 1921457 | 2/2007 |
| CN | 1937591 | 3/2007 |
| CN | 101189598 A | 5/2008 |
| CN | 101442425 A | 5/2009 |
| CN | 101495993 | 7/2009 |
| CN | 101682532 A | 3/2010 |
| CN | 101878663 | 11/2010 |
| CN | ZL 200780001807.5 | 2/2011 |
| CN | 102123156 A | 7/2011 |
| CN | 102577252 A | 7/2012 |
| CN | 103365654 | 10/2013 |
| CN | 103428261 | 12/2013 |
| CN | 103533018 A | 1/2014 |
| CN | 101878663 | 6/2014 |
| CN | 103944954 A | 7/2014 |
| CN | 104040990 A | 9/2014 |
| CN | 104137491 A | 11/2014 |
| CN | 104796396 A | 7/2015 |
| CN | 102577252 B | 3/2016 |
| EP | 1209876 A2 | 5/2002 |
| EP | 1482685 A1 | 12/2004 |
| EP | 1720287 | 11/2006 |
| EP | 2575328 | 10/2008 |
| EP | 2057552 | 5/2009 |
| EP | 2215863 | 8/2010 |
| EP | 2296313 A1 | 3/2011 |
| EP | 2667571 | 11/2013 |
| EP | 2760170 A1 | 7/2014 |
| EP | 2575328 | 11/2014 |
| EP | 2760170 B1 | 12/2015 |
| HK | 1182547 | 11/2013 |
| HK | 1188498 | 5/2014 |
| HK | 1189438 A | 6/2014 |
| HK | 1190539 A | 7/2014 |
| HK | 1182547 A1 | 4/2015 |
| HK | 1199153 A | 6/2015 |
| HK | 1199779 A | 7/2015 |
| HK | 1200617 A | 8/2015 |
| IN | 261CHE2014 A | 7/2016 |
| JP | 2000307634 A | 11/2000 |
| JP | 2004350188 | 12/2004 |
| JP | 2005-518595 | 6/2005 |
| JP | 2006180295 | 7/2006 |
| JP | 2006333245 | 12/2006 |
| JP | 2007048052 | 2/2007 |
| JP | 2011505752 | 2/2011 |
| JP | 5480959 | 2/2013 |
| JP | 2013059122 | 3/2013 |
| JP | 2013070423 | 4/2013 |
| JP | 2013078134 | 4/2013 |
| JP | 5364101 | 9/2013 |
| JP | 5579820 | 7/2014 |
| JP | 5579821 | 7/2014 |
| JP | 2014143686 A | 8/2014 |
| JP | 5906263 B2 | 4/2016 |
| KR | 1020130096624 A | 8/2013 |
| KR | 101576585 B1 | 12/2015 |
| TW | I086309 | 2/1996 |
| TW | I109955 | 12/1999 |
| TW | I130506 | 3/2001 |
| TW | I137392 | 7/2001 |
| WO | WO0113228 A2 | 2/2001 |
| WO | WO0114990 A1 | 3/2001 |
| WO | 03073216 | 9/2003 |
| WO | 03103233 | 12/2003 |
| WO | WO03103237 A1 | 12/2003 |
| WO | 2006065691 | 6/2006 |
| WO | 2007076883 | 7/2007 |
| WO | 2008021620 | 2/2008 |
| WO | WO2008053954 A1 | 5/2008 |
| WO | 2009073295 | 6/2009 |
| WO | WO2011049770 A2 | 4/2011 |
| WO | WO2011079381 A1 | 7/2011 |
| WO | WO2013081952 A1 | 6/2013 |
| WO | WO2013096019 A1 | 6/2013 |
| WO | WO2014031046 A1 | 2/2014 |
| WO | WO2014093829 A1 | 6/2014 |
| WO | WO2015164026 A1 | 10/2015 |

OTHER PUBLICATIONS

Koike et al., "Transport Middleware for Network-Based Control," IEICE Technical Report, Jun. 22, 2000, vol. 100, No. 53, pp. 13-18.

Yamamoto et al., "Performance Evaluation of Window Size in Proxy-based TCP for Multi-hop Wireless Networks," IPSJ SIG Technical Reports, May 15, 2008, vol. 2008, No. 44, pp. 109-114.

Abe et al., "Adaptive Split Connection Schemes in Advanced Relay Nodes," IEICE Technical Report, Feb. 22, 2010, vol. 109, No. 438, pp. 25-30.

Gite, Vivek, "Linux Tune Network Stack (Buffers Size) to Increase Networking Performance," nixCraft [online], Jul. 8, 2009 [retreived on Apr. 13, 2016], Retrieved from the Internt: <URL:http://www.cyberciti.biz/faq/linux-tcp-tuning/>, 24 pages.

FreeBSD, "tcp—TCP Protocol," Linux Programmer's Manual [online], Nov. 25, 2007 [retreived on Apr. 13, 2016], Retreived from the Internet: <URL:https://www.freebsd.org/cgi/man.cgi?query=tcp&apropos=0&sektion=7&manpath=SuSE+Linux%2Fi386+11.0&format=asci>, 11 pages.

Chiussi et al., "A Network Architecture for MPLS-Based Micro-Mobility", IEEE WCNC 02, Orlando, Mar. 2002.

Smith, M. et al; "Network Security Using NAT and NAPT", 10th IEEE International Converence on Aug. 27-30, 2002, Piscataway, NJ, USA, 2012; Aug. 27, 2002; pp. 355-360.

Cardellini et al., "Dynamic Load Balancing on Web-server Systems", IEEE Internet Computing, vol. 3, No. 3, pp. 28-39, May-Jun. 1999.

Wang et al., "Shield: Vulnerability Driven Network Filters for Preventing Known Vulnerability Exploits", SIGCOMM'04, Aug. 30-Sep. 3, 2004, Portland, Oregon, USA.

"Enhanced Interior Gateway Routing Protocol", Cisco, Document ID 16406, Sep. 9, 2005 update, 43 pages.

(56) References Cited

OTHER PUBLICATIONS

Crotti, Manuel et al., "Detecting HTTP Tunnels with Statistical Mechanisms", IEEE International Conference on Communications, Jun. 24-28, 2007, pp. 6162-6168.

Haruyama, Takahiro et al., "Dial-to-Connect VPN System for Remote DLNA Communication", IEEE Consumer Communications and Networking Conference, CCNC 2008. 5th IEEE, Jan. 10-12, 2008, pp. 1224-1225.

Chen, Jianhua et al., "SSL/TLS-based Secure Tunnel Gateway System Design and Implementation", IEEE International Workshop on Anti-counterfeiting, Security, Identification, Apr. 16-18, 2007, pp. 258-261.

"EIGRP MPLS VPN PE-CE Site of Origin (SoO)", Cisco Systems, Feb. 28, 2006, 14 pages.

\* cited by examiner

US 9,806,943 B2

ENABLING PLANNED UPGRADE/DOWNGRADE OF NETWORK DEVICES WITHOUT IMPACTING NETWORK SESSIONS

TECHNICAL FIELD

The present disclosure relates generally to data processing, and, more specifically, to the operation of a network device during planned upgrades or downgrades of the network device.

BACKGROUND

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

Websites, web and mobile applications, cloud computing, and various web and mobile services have been rising in popularity. Some examples of fast growing consumer services include smart phone applications, location based services, navigation services, e-book services, video applications, music applications, Internet television services, Voice over IP, and so forth. Subsequently, more and more servers hosting these applications are deployed within data networks including the Internet to accommodate the increasing computing and data storage needs. These servers are typically arranged in data centers or web farms, which may include intermediate network devices such as Application Delivery Controllers (ADC), Global Server Load Balancers (GSLB) and/or Server Load Balancers (SLB).

In a typical load balancing scenario, an application or service hosted by a group of servers is front-ended by a load balancer (LB) (also referred to herein as a LB device) which represents this service to clients as a virtual service. Clients needing the service can address their packets to the virtual service using a virtual Internet Protocol (IP) address and a virtual port. For example, www.example.com:80 is a service that is being load balanced and there is a group of servers that host this service. An LB can be configured with a virtual IP (VIP) e.g. 100.100.100.1 and virtual port (VPort) e.g. Port 80, which, in turn, are mapped to the IP addresses and port numbers of the servers handling this service. The Domain Name Service (DNS) server handling this domain can be configured to send packets to the VIP and VPort associated with this LB.

Once an ADC, or any other network device, has been deployed in a network, it may need to be upgraded or downgraded for any number of reasons. For services that need to operate continuously, any change in the intermediate network device will disrupt the flow of traffic over the network and the user's ability to access the service over the network through a client device. Data may also be lost in transit. This disruption in service may affect the quality of the service, as well as increase the response time for the client. Furthermore, once a network device has had a software update, it may need to be restarted, which will cause the existing session to be lost.

Additionally, Layer 7 network sessions may be particularly data-intensive. Thus, it may not be feasible to prepare a network device providing an application layer service for an upgrade or downgrade by copying all of the data from the first network device to a second network device. For example, a client device may be streaming a video over the network, or accessing an encrypted file. Copying the entire network session to a second network device to also provide the streaming video or encrypted file for all users may use too many resources.

Thus, a mechanism is needed whereby planned changes may be made to a network device within a network without resulting in disruption to the service being provided by the network device.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The present disclosure is related to approaches for conducting a planned upgrade or downgrade of a first network device without impacting the network sessions that are handled by that device. The method may comprise synchronizing a TCP session between a client device and the first network device with a second network device, the second device being a standby device, and creating a redirect network session for the TCP session at the second network device. During the planned network change, the second network device may become the active network device and receive the server response. The second network device may recognize that the server response is associated with the redirect network session, and redirect the server response to the first network device to be forwarded to the client device. The second network device may also handle all new service requests from the client device, since it now the active device for the service. The method may continue until all existing sessions handled by the first network device are completed or time out. The first network device may then be upgraded or downgraded without impacting any existing network sessions.

In further example embodiments of the present disclosure, the method steps are stored on a machine-readable medium comprising instructions, which when implemented by one or more processors perform the recited steps. In yet further example embodiments, hardware systems, or devices can be adapted to perform the recited steps. Other features, examples, and embodiments are described below.

BRIEF DESCRIPTION OF THE DRAWINGS

Embodiments are illustrated by way of example, and not by limitation, in the figures of the accompanying drawings, in which like references indicate similar elements.

DETAILED DESCRIPTION

Figure 1:
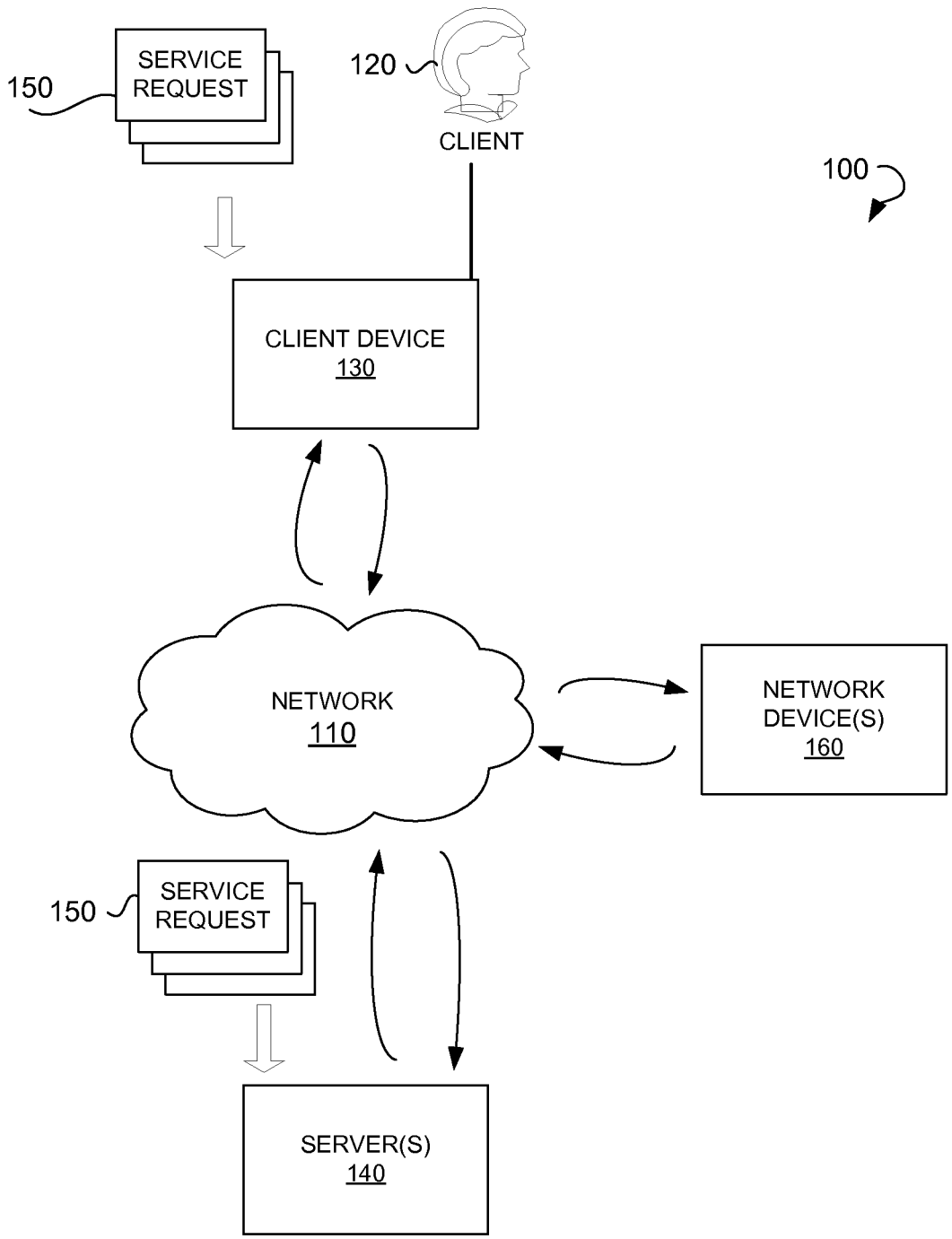
FIG. 1 shows an environment within which a service may be provided to a user from one or more servers over a network.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

Embodiments disclosed herein may be implemented using a variety of technologies. For example, the methods described herein may be implemented in software executing on a computer system or in hardware utilizing either a combination of microprocessors or other specially designed application-specific integrated circuits (ASICs), programmable logic devices like FPGA's, or various combinations thereof. In particular, the methods described herein may be implemented by a series of computer-executable instructions residing on a storage medium such as a disk drive, or computer-readable medium. It should be noted that methods disclosed herein can be implemented by a computer, e.g., a desktop computer, tablet computer, laptop computer, smartphone and so forth.

The present technology provides various methods for operation of ADCs and GSLBs in data networks such as the Internet including a plurality of switches, routers, virtual switches, web farms, host servers, and other units. The present technology provides enhanced performance of ADC and allows implementing scalable business solutions for any services, applications, clouds and organizations. Furthermore, the present technology provides a scalable, high-performance application networking platform, which can delivers superior reliability and energy efficiency at lower total cost of ownership. An ADC can also provide increased infrastructure efficiency, a faster end user experience, comprehensive Layer 4-7 feature set and flexible virtualization technologies such as Virtual Chassis System, multi-tenancy, and more for public, private and hybrid cloud environments. The ADC and GSLB may include software and/or hardware components/platforms that may vary depending on a particular application, performance, infrastructure, network capacity, data traffic parameters, and so forth. The functionality of application delivery controllers and load balancers are also described in more detail in U.S. patent application Ser. No. 13/791,760 entitled "Application Delivery Controller and Global Server Load Balancer" which is incorporated herein by reference in its entirety.

Exemplary embodiments of the presently disclosed technology are deployed on a Layer 7 TCP/IP network. A TCP network session may be established between any two devices in the network via the TCP "handshake". This is described in more detail in U.S. patent application Ser. No. 13/413,191 entitled "System and Method for an Adaptive TCP Syn Cookie with Time Validation" which is incorporated herein by reference in its entirety.

Referring now to the drawings, FIG. 1 illustrates an environment 100 within which a service may be provided to a user from one or more servers over a network. The environment 100 may include a network 110, a client 120, a client device 130, one or more network devices 160 for distributing network traffic, and one or more servers 140. The client 120 may include a user or a host associated with the network 110.

The network 110 may include the Internet or any other network capable of communicating data between devices. Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34 bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network.

The network 110 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking. The network 110 may include a network of data processing nodes that are interconnected for the purpose of data communication. The network 110 may include software driven network (SDN). The SDN may include one or more of the above network types. Generally the network 110 may include a number of similar or dissimilar devices connected together by a transport medium enabling communication between the devices by using a predefined protocol. Those skilled in the art will recognize that the present disclosure may be practiced within a variety of network configuration environments and on a variety of computing devices.

As shown in FIG. 1, the client 120 may send one or more service requests 150 to (backended) servers 140 through a client device 130. The service requests 150 may include an HTTP request, a video streaming request, a file download request, a transaction request, a conference request, or any other service provided over a network. The client device 130 may include an end user computer, mobile phone, tablet, thin client, or any other device from which a user may access the service.

The servers 140 may include a web server, a wireless application server, an interactive television server, and so forth. The network device(s) 160 may include an ADC, GSLB, LB, or any other mechanism for service load distribution. The network device 160 may balance the flow of the service requests 150 among traffic forwarding devices of the network 110. The load balancing may enhance utilization of resources and enable maximize throughput with minimum response time, hence avoiding overloading of a single server. With this technology, network traffic may be distributed among different web farms, data centers, and servers 140 located at different geographical locations. Furthermore, as will be appreciated by those skilled in the art, network device 160 may act as a master to monitor "health" and responsiveness of services hosted by the servers 140.

The network device 160 may also analyze the flow of the service requests 150 and determine which and how many traffic forwarding devices of the network 110 are needed to deliver the service requests 150 to the servers 140. The network device 160 may also inspect incoming data packets and apply data policies or algorithms to determine the server(s) to deliver the service requests to. The policy may be a forwarding policy, security policy, service policy, or any other type of policy. In exemplary embodiments, the network device 160 may also modify the data packets as necessary before delivering the service requests 150 to the servers 140. The network device 160 may also inspect data packets and modify them as necessary in the server to client traffic direction.

Figure 2:
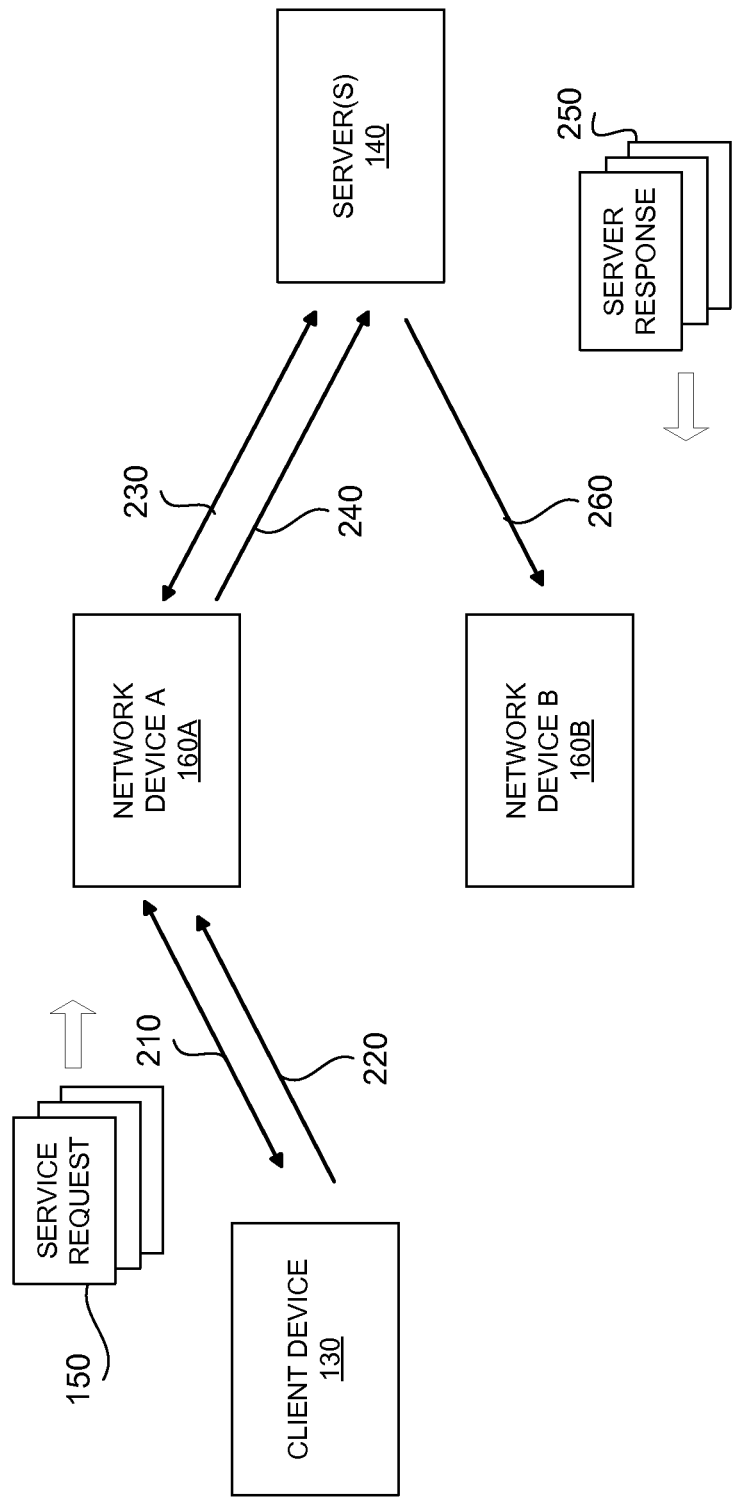
FIG. 2 shows a flow for a data packet during a planned network change for an existing service, according to an example embodiment.

FIG. 2 illustrates an exemplary flow for a data packet during a planned network change for an existing service provided to a user from one or more servers over a network. The steps of the flow may be performed in varying orders or concurrently. In various embodiments, the flow illustrated in FIG. 2 may apply to data packets of Layer 7 sessions. In flow 210, a client device 130 conducts a TCP handshake with network device A 160A and establishes a TCP network session with network device 160A. The TCP handshake may comprise the exchange of a SYN packet, SYN/ACK packet, and ACK packet, as understood by a person of ordinary skill in the art. In flow 220, the client device 130 may then send a service request to network device 160A. The service request may be for a virtual IP address, HTTP, GET, etc. In exemplary embodiments, network device 160A may then determine which server to deliver the service request to by conducting load balancing on a plurality of servers that are designated for the service. Network device 160A may then conduct a TCP handshake with the designated server 140 to establish a TCP network session between these two devices in flow 230. Alternatively, network device 160A may use an existing TCP network session with a server 140. The network device 160A may then deliver the service request to the server(s) in flow 240. The server 140 may be a server computer, load balancer, ADC, or any other network component.

During normal operation, the server 140 may then process the service request 150 and generate a server response 250, which is delivered to network device 160A, and forwarded to client device 130. One or more security, forwarding, or other policies may also be employed at any stage of this process.

During a planned network change (such as an upgrade or downgrade of network device 160A), the network administrator may choose to remove network device 160A as the active device for any reason, and configure an additional network device 160B as the active device. Network device 160B may be a surplus network device previously connected to the network 110, or a new device added to the network for the planned network change. Network device 160B may have previously been configured as a backup for network device 160A, or may have been an active device for a different virtual service.

In an exemplary embodiment, once network device 160B has been configured as the active device for the virtual service, the server response 250 is delivered to network device 160B via flow 260. However, since network device 160B does not have the open TCP session with client device 130 for the service request 150, it will not recognize the network session for the server response 250. As such, network device 160B may not know where to deliver server response 250 and may simply drop the data packet(s) from the server, resulting in a loss of data. When client device 130 does not receive server response 250 after a designated amount of time, it may have to re-send service request 150 to start the process of requesting the service again.

Figure 3:
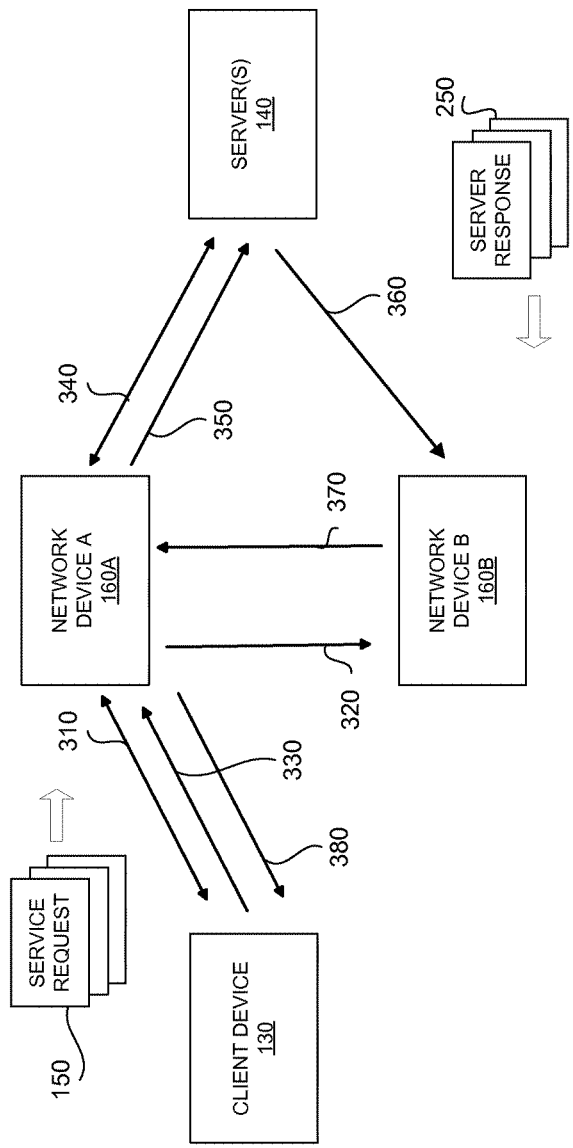
FIG. 3 shows a flow for a data packet during a planned network change, utilizing dual operation of two network devices to provide the service, according to an example embodiment.

FIG. 3 illustrates an exemplary embodiment of a flow for a data packet during a planned network change, utilizing dual operation of two network devices to provide the service over the network. The steps of the flow may be performed in varying orders or concurrently. In various embodiments, the flow illustrated in FIG. 3 may apply to data packets of Layer 7 sessions.

In preparation for a planned network change, such as an upgrade or downgrade, of network device 160A, a second network device 160B may be deployed as a standby or backup device to the active network device 160A. In exemplary embodiments, the standby network device 160B may be upgraded or downgrade first, before being deployed in the network. Alternatively, standby network device 160B may be upgraded or downgraded after network device 160A.

In an example embodiment, a client device 130 may conduct a TCP handshake with network device 160A and establish a TCP network session with network device 160A in flow 310. The TCP handshake may comprise the exchange of a SYN packet, SYN/ACK packet, and ACK packet, as understood by a person of ordinary skill in the art. In flow 320, network device 160A may then send information to the standby network device 160B to create a similar, local session on network device 160B. Network device 160B may then create a redirect TCP session, such that it can recognize incoming traffic originally destined for network device 160A as needing to be redirected to network device 160A. The redirect session created at network device 160B may comprise all of the data contained in the network session, or may contain only certain identifying information needed to recognize the network session. For example, the redirect session may contain only the source IP address, destination IP address, source port, destination port, and network protocol. Fewer or additional components may be a part of the redirect session, as will be understood by a person of ordinary skill in the art.

In flow 330, client device 130 may then send a service request 150 to network device 160A, since it is still the active network device for the service. The service request may be for a virtual IP address, HTTP, GET, etc. In exemplary embodiments, network device 160A may determine which server to deliver the service request to by conducting load balancing on a plurality of servers that are designated for the service. Network device 160A may then conduct a TCP handshake with the designated server 140 to establish a TCP network session between these two devices in flow 340. Alternatively, network device 160A may use an existing TCP network session with a server 140. The network device 160A may then deliver the service request to the server(s) in flow 350. The server 140 may be a server computer, load balancer, ADC, or any other network component.

In an example embodiment, the network administrator may decide to switch the active network device for the virtual service from network device 160A to network device 160B, in order to prepare network device 160A for upgrade. When the server 140 processes the service request 150, it may generate a server response 250, which may then be delivered to network device 160E in flow 360, since this is now the active device for the service. Network device 160E may then recognize information in the data packet(s) of server response 250 as being a part of the redirect session that originated from network device 160A. Network device 160B may then redirect server response 250 to network device 160A in flow 370, since that is the device for which the client device 130 has established the TCP session. In exemplary embodiments, network device 160B may also conduct a session lookup to match the received data in flow 360 with the redirect session entry created in flow 320. Network device 160B may match one or more of source IP address, destination IP address, source port, destination port, protocol, or any other information from the network session. The server response 250 may then be delivered to client device 130 in flow 380. One or more security, forwarding, or other policies may also be employed at any stage of this process as well.

In various embodiments, after network device 160B has been configured as the active device for the service, a new service request 150 from client device 130 may be directed to network device 160B, since it is now the active device. In these embodiments, network device 160B may receive the service request 150 from client device 130 and deliver the request to the server 140. Network device 160B may also receive the server response 250 and deliver it to the client device 130. However, a server response 250 from a service request 150 that was previously received by network device 160A, may continue to be redirected to network device 160A. As such, the two network devices 160A and 160B may both be handling service requests from client device 130 for a period of time.

The dual operation of network devices 160A and 160B may continue until all of the existing sessions from network device 160A have timed out or are completed. Once network device 160A has finished processing all of its existing sessions, it may be ready for upgrade or downgrade. Existing sessions from network device 160A may also be marked to time out faster or slower so that the planned network change can occur at a specific time. By waiting until network device 160A no longer has any open network sessions, the device may be upgraded or downgraded without any resulting data loss in the network. Additionally, client device 130 may receive the service seamlessly and without disruption over the network.

While embodiments have been described herein in the context of a single client 120 and client device 130, it will be understood by persons of ordinary skill in the art that any number of clients and client devices may be able to access a service of a network in a similar manner. Additionally, while the example embodiments have been depicted in FIGS. 2 and 3 with a single active network device and a single standby network device, any number of network devices may be utilized in a similar manner.

Figure 4:
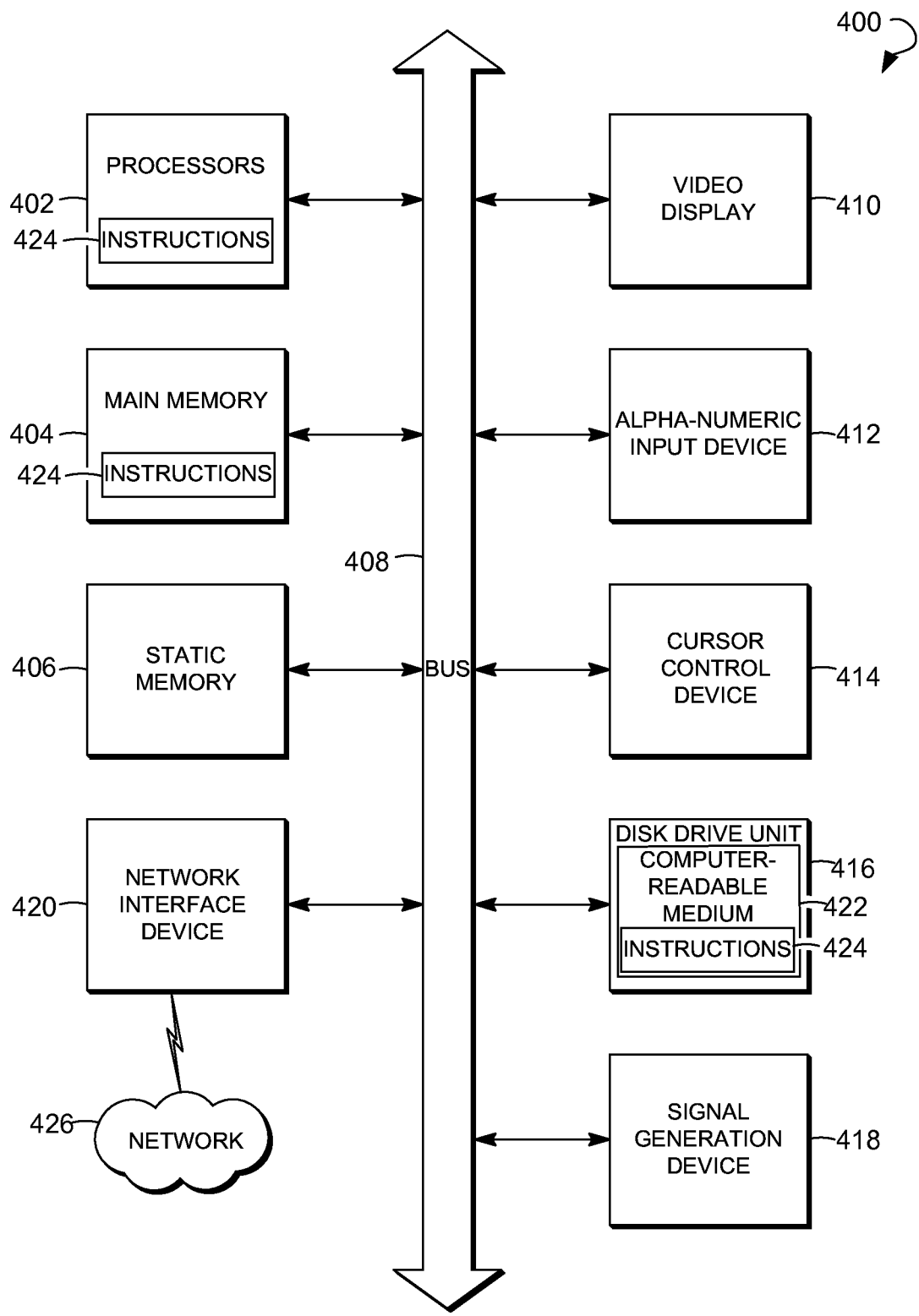
FIG. 4 shows a diagrammatic representation of a computing device for a machine in the example electronic form of a computer system, within which a set of instructions for causing the machine to perform any one or more of the methodologies discussed herein can be executed.

FIG. 4 shows a diagrammatic representation of a machine in the example electronic form of a computer system 400, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a PC, a tablet PC, a set-top box (STB), a cellular telephone, a portable music player (e.g., a portable hard drive audio device such as a Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processor or multiple processors 402 (e.g., a central processing unit (CPU), a graphics processing unit (GPU), or both), a main memory 404 and a static memory 406, which communicate with each other via a bus 408. The computer system 400 may further include a video display unit 410 (e.g., a liquid crystal display (LCD) or a cathode ray tube (CRT)). The computer system 400 may also include an alpha-numeric input device 412 (e.g., a keyboard), a cursor control device 414 (e.g., a mouse), a disk drive unit 416, a signal generation device 418 (e.g., a speaker), and a network interface device 420.

The disk drive unit 416 includes a non-transitory computer-readable medium 422, on which is stored one or more sets of instructions and data structures (e.g., instructions 424) embodying or utilized by any one or more of the methodologies or functions described herein. The instructions 424 may also reside, completely or at least partially, within the main memory 404 and/or within the processors 402 during execution thereof by the computer system 400. The main memory 404 and the processors 402 may also constitute machine-readable media.

The instructions 424 may further be transmitted or received over a network 426 via the network interface device 420 utilizing any one of a number of well-known transfer protocols (e.g., Hyper Text Transfer Protocol (HTTP)).

While the computer-readable medium 422 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAMs), read only memory (ROMs), and the like.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method can be written in any number of suitable programming languages such as, for example, Hypertext Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Perl, UNIX Shell, Visual Basic or Visual Basic Script, Virtual Reality Markup Language (VRML), ColdFusion™ or other compilers, assemblers, interpreters or other computer languages or platforms.

Thus, methods and systems for enabling planned upgrades and downgrades of a network device with minimum to no impact on network sessions are disclosed. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A method for enabling a planned upgrade or a planned downgrade of a first network device, the method comprising:
    establishing, at the first network device, a TCP session with a client device;
    receiving, at the first network device, a request for a virtual service over a network by the client device;
    creating a redirect network session for the TCP session at a second network device based on information associated with the TCP session, the second network device being a standby device for the first network device, wherein the information associated with the TCP session is sent by the first network device to the second network device upon establishing the TCP session with the client device;
    delivering, by the first network device, the request for the virtual service over a network to a server;
    receiving a change from a network administrator designating the second network device as an active device for the virtual service;
    receiving a server response at the second network device;
    recognizing, at the second network device, that the server response is associated with the redirect network session;
    redirecting, by the second network device, the server response to the first network device in accordance with the redirect network session; and
    sending, by the first network device, the server response to the client device,
    wherein the first network device delivers further requests associated with the TCP session from the client device directly to the server until the virtual service is completed, and
    wherein the second network device redirects further server responses associated with the redirect network session to the first network device until the virtual service is completed.

2. The method of claim 1, wherein the redirect network session comprises at least one of a source IP address, a destination IP address, a source port, destination port, and protocol.

3. The method of claim 1, wherein the virtual service is a virtual IP address.

4. The method of claim 1, wherein the request for the virtual service is a GET request.

5. The method of claim 1, wherein the delivering the request for the virtual service over a network to the server by the first network device further comprises load balancing of a plurality of servers.

6. The method of claim 1, wherein the recognizing, at the second network device, that the server response is associated with the redirect network session further comprises conducting a session lookup at the second network device to determine the TCP session that corresponds with the server response received.

7. The method of claim 1, wherein the first network device is an application delivery controller.

8. The method of claim 1, wherein the first network device is a global server load balancer.

9. The method of claim 1, wherein the second network device is an application delivery controller.

10. The method of claim 1, wherein the second network device is a global server load balancer.

11. The method of claim 1, further comprising upgrading the first network device after the redirect network session times out.

12. A system for enabling a planned upgrade or a planned downgrade of a first network device during a TCP session, the first network device configured to:
    establish a TCP session with a client device;
    receive a request for a virtual service over a network by the client device;
    deliver the request for the virtual service over a network to a server;
    receive a change from a network administrator designating a second network device as an active device for the virtual service, the second network device being a standby device for the first network device, the second device creating a redirect network session for the TCP session based on information associated with the TCP session, wherein the information associated with the TCP session is sent by the first network device to the second network device upon establishing the TCP session with the client device;
    receive a redirected server response from the second network device; and
    send the redirected server response to the client device,
    wherein the first network device delivers further requests associated with the TCP session from the client device directly to the server until the virtual service is completed, and
    wherein the second network device redirects further server responses associated with the redirect network session to the first network device until the virtual service is completed.

13. The system of claim 12, wherein the virtual service is a virtual IP address.

14. The system of claim 12, wherein the request for the virtual service is a GET request.

15. The system of claim 12, wherein the first network device is further configured to load balance a plurality of servers before delivering the request for the virtual service over a network to the server.

16. The system of claim 12, wherein the first network device is an application delivery controller.

17. The system of claim 12, wherein the first network device is a global server load balancer.

18. The system of claim 12 further comprising the second network device configured to:
 receive a server response;
 recognize that the server response is associated with the redirect network session; and
 redirect the server response to the first network device.

19. The system of claim 18, wherein the redirect network session comprises at least one of a source IP address, a destination IP address, a source port, destination port, and protocol.

20. A non-transitory processor-readable medium having instructions stored thereon, which when executed by one or more processors, cause the one or more processors to perform the following operations:
 establishing, at the first network device, a TCP session with a client device;
 receiving, at the first network device, a request for a virtual service over a network by the client device;
 creating a redirect network session for the TCP session at a second network device based on information associated with the TCP session, the second network device being a standby device for the first network device, wherein the information associated with the TCP session is sent by the first network device to the second network device upon establishing the TCP session with the client device;
 delivering, by the first network device, the request for the virtual service over a network to a server;
 receiving a change from a network administrator designating the second network device as an active device for the virtual service;
 receiving a server response at the second network device;
 recognizing, at the second network device, that the server response is associated with the redirect network session;
 redirecting, by the second network device, the server response to the first network device in accordance with the redirect network session; and
 sending, by the first network device, the server response to the client device,
 wherein the first network device delivers further requests associated with the TCP session from the client device directly to the server until the virtual service is completed, and
 wherein the second network device redirects further server responses associated with the redirect network session to the first network device until the virtual service is completed.

* * * * *